UNITED STATES PATENT OFFICE.

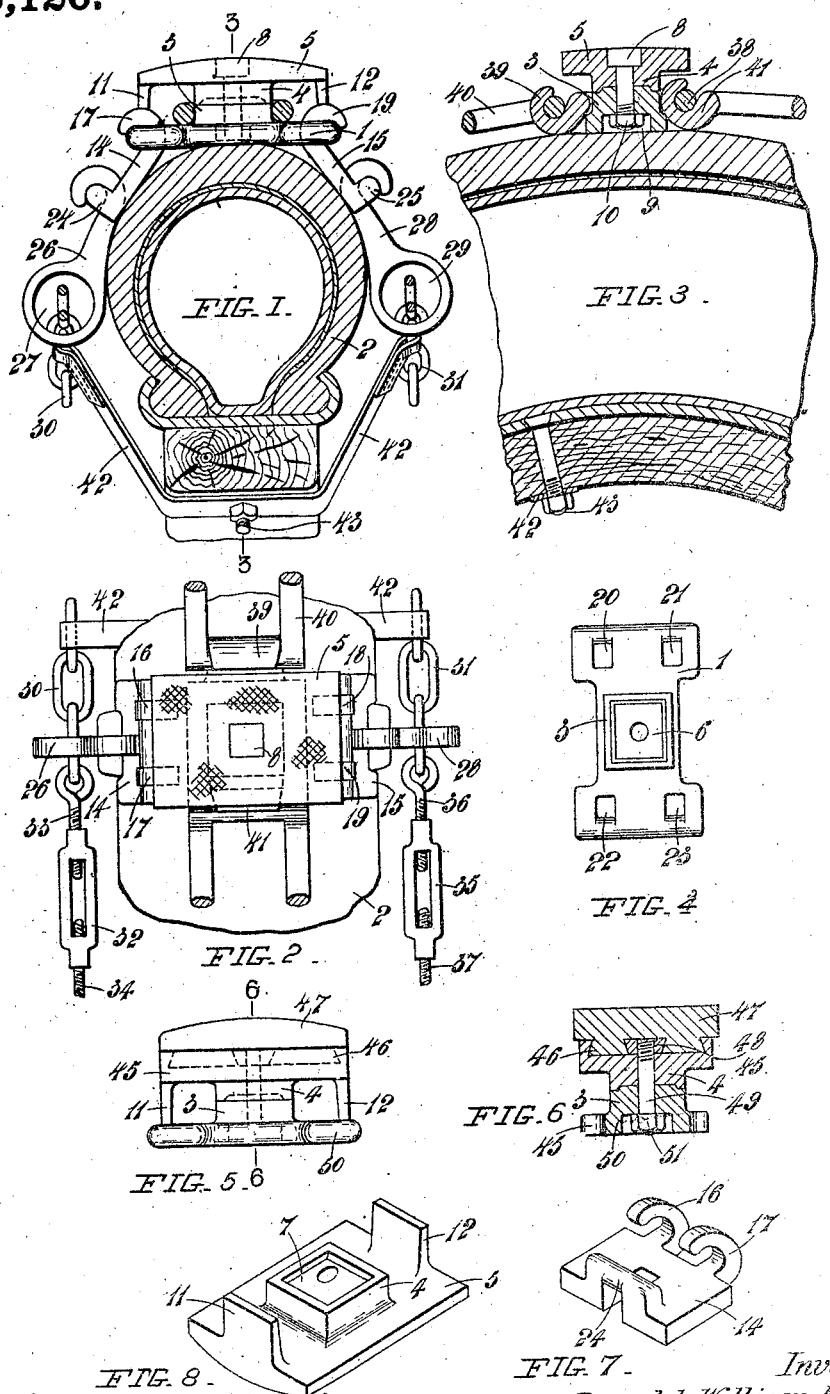

DONALD WILLIAM McLEAN, OF MOUNT HUTT, METHVEN, NEW ZEALAND.

TIRE.

935,126.

Specification of Letters Patent. Patented Sept. 28, 1909.

Application filed July 9, 1907. Serial No. 382,894.

*To all whom it may concern:*

Be it known that I, DONALD WILLIAM MCLEAN, a subject of His Majesty the King of Great Britain and Ireland, residing at Mount Hutt, Methven, in the provincial district of Canterbury, in the Colony of New Zealand, have invented certain new and useful Improvements in Tires, of which the following is a specification.

The invention relates to pneumatic tires for the wheels of vehicles and provides improved means for protecting such tires from puncture and for reducing wear and tear.

According hereto I provide a tire with a plurality of protector blocks which one after the other come in contact with the ground during the rotation of the wheel to which they are applied.

The whole series of protector blocks are held upon the tires by means of grapples and hooks which connect them to chains one upon each side of the tire. A rectangular link chain also connects the entire series of blocks around the periphery of the wheel.

My invention is illustrated in the accompanying drawing wherein:—

Figure 1 is a cross section of a tire fitted with my invention, Fig. 2 a corresponding plan. Fig. 3 a part transverse sectional elevation on the line 3—3, Fig. 1. Fig. 4 a plan of a bed plate, part of the apparatus. Fig. 5 is a side elevation, and Fig. 6 a sectional elevation on 6—6, Fig. 5. Fig. 7 is a side end perspective elevation of a grappler. Fig. 8 is an inverted plan of a tread piece.

Referring first to Figs. 1 to 4 inclusive and Fig. 7 the protector block comprises a bed plate 1 and a tread piece 5. The bed plate 1 rests upon the circumference of the pneumatic tire 2 and has a rectangular projection 3 corresponding with a projection 4 from the tread piece 5. The projection 3 also has the projection 6 which closely fits a corresponding recess 7 in the projection 4.

A bolt 8 passes through the tread piece (which has a counter sunk hole to receive the head of the bolt) and through the projection 3 from the bed plate. The bed plate has a recess 9 to receive the nut 10 of the bolt.

The tread piece has downwardly projecting flanges 11 and 12 (see Fig. 8) one at each end which bear upon the bed plate between the sides of the links of a sprocket chain hereinafter referred to. The bed plate is held upon the tire by grapples 14 and 15 one upon each side.

The grapple 14 has hooks 16 and 17 and grapple 15 has similar hooks 18 and 19 (see Figs. 2 and 7). These hooks severally pass through holes 20, 21 22 and 23 in the bed plate (see particularly Fig. 4,) and engage over round bars formed upon the ends of the plate.

Each grappler has a link at its lower end 24 and 25 respectively. The link 24 being engaged by hook 26 having an eye 27 and the link 25 being engaged by hook 28 having an eye 29.

A chain 30 passes through the eye 27 and through all the series of similar eyes used in connection with similar tread pieces upon that side of the wheel and a chain 31 passes through the eye 29 and all the series of similar eyes upon that side of the wheel. The chain 30 is tightened by turning the tension bow 32 which receives at one end screw 33 connected to one end of the chain and at the opposite end a screw 34 connected to the other end of the chain. The chain 31 is tightened in a similar manner by the tension bow 35 which receives the screws 36 and 37 upon the respective ends of the chain.

As many protector blocks may be used as considered advisable and the whole series around the circumference of the wheel are connected together by a chain having rectangular links 38 adapted to neatly receive the projection 3. The said link has a hook 39 which receives the next link 40 of the chain upon one side and upon the opposite side receives the hook 41 formed upon the next link of the chain upon that side (see Fig. 3). This is a well known form of square link sprocket chain.

To prevent the apparatus from coming off in case the tire should become deflated I connect the chains 30 and 31 by leather thongs 42 to the security bolts of the wheel. One of these bolts 43 with the connecting thong is shown in Fig. 1.

The whole series of protector blocks are placed in position before the tire is inflated. The inflation of the tire securing them in position. The tread pieces described are preferably made of metal for instance aluminium but if desired rubber blocks may be inserted within them as will be now described by reference to Figs. 5 and 6.

The bed plate 45 is made with a rectangular dovetail recess to receive the similarly dove-tailed projection 46 integral with the rubber block 47.

The dovetail shaped nut 48 is embedded in the rubber block and the screw bolt 49 passes through the bed plate 50 (which is precisely similar to bed plate 1 referred to) and through the bed plate 45 into a nut 51.

What I do claim and desire to secure by Letters Patent of the United States is:—

In a tire protector of the class described the combination with a plurality of bedplates having rectangular projections, treadpieces recessed to fit the rectangular projections, means for securing the treadpieces to the bedplates, and means for attaching the bedplates to a tire, of rectangular links fitting around the rectangular projections and forming a circumferential chain connecting together the said bedplates, as set forth.

In testimony whereof I have signed my name to this specification in the presence of two witnesses.

DONALD WILLIAM McLEAN.

Witnesses:
ALFRED HENRY HART,
ARCHIBALD DOUGLAS COOK.